(12) United States Patent
Bruggesser et al.

(10) Patent No.: US 9,440,380 B2
(45) Date of Patent: Sep. 13, 2016

(54) COMPONENT AND ASSOCIATED PRODUCTION METHOD

(75) Inventors: Veit Bruggesser, Hildrezhausen (DE); Juergen Stehlig, Neckartenzlingen (DE); Andreas Eilemann, Erdmannhausen (DE); Hubert Pomin, Sindelfingen (DE); Christian Saumweber, Stuttgart (DE)

(73) Assignees: Mahle International GmbH (DE); Behr GmbH & Co. KG (DE)

( * ) Notice: Subject to any disclaimer, the term of this patent is extended or adjusted under 35 U.S.C. 154(b) by 5 days.

(21) Appl. No.: 14/111,562

(22) PCT Filed: Apr. 13, 2012

(86) PCT No.: PCT/EP2012/056771
§ 371 (c)(1),
(2), (4) Date: Dec. 30, 2013

(87) PCT Pub. No.: WO2012/140196
PCT Pub. Date: Oct. 18, 2012

(65) Prior Publication Data
US 2014/0116371 A1    May 1, 2014

(30) Foreign Application Priority Data
Apr. 14, 2011   (DE) .................. 10 2011 007 432

(51) Int. Cl.
*B29C 39/22*   (2006.01)
*F02M 35/10*   (2006.01)
(Continued)

(52) U.S. Cl.
CPC ............ *B29C 39/22* (2013.01); *B29C 45/006* (2013.01); *B29C 65/103* (2013.01);
(Continued)

(58) Field of Classification Search
CPC ............ B29C 39/22; B29C 65/1432; B29C 66/1142; B29C 66/54; B29C 65/1416; B29C 65/103; B29C 45/006; B29C 2045/0074; B29C 65/08; B29C 65/16; B29C 2045/0067; B29C 2045/0063; F02M 35/10; F02M 35/1036; F02M 35/112; F02M 35/10268; Y10T 29/4998; Y10T 29/49968; Y10T 29/49873; Y10T 29/49893; Y10T 29/49872
See application file for complete search history.

(56) References Cited

U.S. PATENT DOCUMENTS 5,833,785 A    11/1998  Centofante
6,416,706 B1 *  7/2002  Fisher et al. .................. 264/484
(Continued)

FOREIGN PATENT DOCUMENTS

DE    10215458 C1    7/2003
JP    55-139217      10/1980
(Continued)

OTHER PUBLICATIONS

English abstract for JP2009-220429.
(Continued)

*Primary Examiner* — John C Hong
(74) *Attorney, Agent, or Firm* — Fishman Stewart Yamaguchi PLLC

(57) ABSTRACT

A method for producing an intake module may include providing a housing and at least one intercooler arranged therein; forming at least two housing parts via injection molding from plastic; inserting at least one intercooler into at least one of the housing parts; wherein the housing parts, with at least one intercooler inserted therein, are welded together to form the housing; and wherein the intercooler has contact points to at least two of the housing parts.

19 Claims, 10 Drawing Sheets

(51) Int. Cl.
*B29C 45/00* (2006.01)
*B29C 65/10* (2006.01)
*B29C 65/14* (2006.01)
*B29C 65/00* (2006.01)
*F02M 35/112* (2006.01)
*B29C 65/08* (2006.01)
*B29C 65/16* (2006.01)

(52) U.S. Cl.
CPC ...... *B29C 65/1416* (2013.01); *B29C 65/1432* (2013.01); *B29C 66/1142* (2013.01); *B29C 66/54* (2013.01); *B29C 66/83221* (2013.01); *F02M 35/10* (2013.01); *F02M 35/1036* (2013.01); *F02M 35/10268* (2013.01); *F02M 35/112* (2013.01); *B29C 65/08* (2013.01); *B29C 65/16* (2013.01); *B29C 2045/0063* (2013.01); *B29C 2045/0067* (2013.01); *B29C 2045/0074* (2013.01); *Y10T 29/4998* (2015.01); *Y10T 29/49872* (2015.01); *Y10T 29/49893* (2015.01); *Y10T 29/49968* (2015.01)

(56) References Cited

U.S. PATENT DOCUMENTS

| | | | |
|---|---|---|---|
| 6,454,295 B2* | 9/2002 | Bieber et al. | 280/728.3 |
| 6,679,215 B2* | 1/2004 | Benson et al. | 123/184.34 |
| 2004/0061249 A1 | 4/2004 | Umezawa et al. | |
| 2007/0131401 A1 | 6/2007 | Daly et al. | |
| 2010/0077996 A1* | 4/2010 | Pantow et al. | 123/557 |
| 2010/0086761 A1 | 4/2010 | Okuda | |

FOREIGN PATENT DOCUMENTS

| | | |
|---|---|---|
| JP | 58-28317 | 2/1983 |
| JP | 7-10430 | 2/1995 |
| JP | 2001-026056 A | 1/2001 |
| JP | 2007-296700 A | 11/2007 |
| JP | 2009-220429 A | 10/2009 |
| JP | 2010-90234 | 4/2010 |
| JP | 2010-090234 A | 4/2010 |
| JP | 2010-223038 A | 10/2010 |
| WO | WO-03/024566 A1 | 3/2003 |

OTHER PUBLICATIONS

English abstract for JP2008-221530.
English abstract for JP2007-296700.
English abstract for JP2001-026056.
English abstract for DE-10215458.
English abstract for JP2010-223038.
English abstract for JP58-28317.
English abstract for JP55-139217.
Japanese Office Action for JP-2014-054338 dated Nov. 18, 2015 (English translation included).

* cited by examiner

COMPONENT AND ASSOCIATED PRODUCTION METHOD

CROSS REFERENCE TO RELATED APPLICATIONS

This application claims priority to German Patent Application No. 10 2011 007 432.5 filed Apr. 14, 2011, and International Patent Application No. PCT/EP2012/056771 filed Apr. 13, 2012, both of which are hereby incorporated by reference in their entirety.

TECHNICAL FIELD

The present invention relates to a method for producing a component that has a housing and at least one functional insert arranged therein. The invention further relates to a component produced by means of this method. Moreover, the invention relates to a tool for carrying out such a production method.

BACKGROUND

There is a comparatively high interest in producing components with inserts as cost-effectively as possible, in particular in series production and preferably in the production of motor vehicles. Components that comprise a housing and an insert arranged therein are, e.g., mufflers, filters and heat exchangers. Without limiting the generality of the idea underlying the invention, the present invention relates in particular to an intercooler, the cooler housing of which forms a fresh air channel section in which a cooler block is arranged. The cooler block usually contains a fresh air path through which the charged fresh air to be cooled can flow, and a coolant path through which a heat-dissipating coolant can flow. In this case, the fresh air path and the coolant path are media-separated and coupled to each other in a heat-transferring manner.

Intercoolers are known, e.g., from DE 10 2007 030 464 A1, DE 10 2009 012 024 A1, DE 10 2009 025 282 A1 and DE 10 2009 050 258 B3.

For producing such components, in particular such intercoolers, it is common practice to first produce the housing and then to insert the functional insert. Depending on the pressure load on the housing, sealing the housing in the region of the insertion opening through which the functional insert can be inserted into the housing is comparatively complicated.

SUMMARY

The present invention is concerned with the problem of providing for a component of the aforementioned kind and for an associated production method an improved embodiment which is in particular characterized by reduced complexity while achieving sufficient sealing.

This problem is solved according to the invention by the subject matters of the independent claims. Advantageous embodiments are subject matter of the dependent claims.

The invention is based on the general idea of configuring the housing in multiple pieces, producing the individual housing parts from plastic by means of injection moulding technology, and welding together the separate housing parts produced in this manner so as to form the housing. Prior to welding the housing parts, at least one functional insert will be placed into at least one of the housing parts so that when welding the housing parts, thus when joining the housing, the respective functional insert is already properly arranged in the housing. For this, the invention utilizes the knowledge that the multi-piece housing is open prior to joining the housing parts so that it is also readily possible to place rather large functional inserts into the respective housing part. By joining the housing parts so as to form the housing, the housing is closed and consequently, the respective functional insert is enclosed inside the housing. Thus, a separate insertion opening for inserting the functional insert can be dispensed with so that accompanying sealing problems and the associated outlay are also eliminated. The functional insert contacts at least two housing parts. By joining the housing parts, the functional insert is held between the housing parts in such a manner that relative movements between the functional insert and the housing parts are prevented.

Preferably, the functional insert has a projection which is formed to partially or completely extend circumferentially around the functional insert. The projection is received at least in certain regions by a receptacle which is preferably formed as a groove.

In other embodiments, the projection can also be arranged on the housing parts, and the groove can be arranged on the functional insert. In advantageous configurations of the invention, the functional insert corresponds with the housing at two or more axially spaced places.

In another configuration, the housing parts comprise in particular a multi-piece limit stop for the functional insert which limits the relative movements of the functional insert in the housing. These are, e.g., webs which are spaced apart from each other and have tolerances in such a manner that the functional insert is fitted in without play.

By mounting, according to the invention, the functional component in freshly injection moulded housing parts, the housing parts are not yet noticeably distorted or shrunk. During further cooling of the housing parts, they adapt to the functional component, whereby the functional component is arranged without play in the respective receptacle.

Advantageously, the at least two housing parts are each injection moulded in an injection moulding tool section. It is principally possible here to form the two injection moulding tool sections in separate injection moulding tools. However, advantageous is an embodiment in which the at least two injection moulding tool sections are formed in the same injection moulding tool. Through this it is achieved that the housing parts belonging together are produced substantially simultaneously, wherein, moreover, substantially the same temperatures and plastic compositions are obtained.

Particularly advantageous is a refinement in which, for the welding process, the at least two housing parts remain in each case in one tool part of the multi-piece injection moulding tool sections. In other words, for welding the housing parts, the housing parts do not have to be removed from the mould; rather, they can remain in the associated tool part of the respective injection moulding tool section. Thus, on the one hand, inserting the functional insert and welding the housing parts takes place in a timely manner since the injection moulding tool sections have to be available again within the series production as soon as possible. On the other hand, this results in the same time in the fact that the housing parts are processed in a freshly injection moulded state so that no disturbing water could become embedded in the plastic. In particular in the welding zones in which the housing parts are to be welded together, water inclusions can be disturbing and, e.g., can affect the quality of the respective weld seam. Thus, the complete housing with integrated functional insert is removed from the mould.

Moreover, the fact that the housing parts remain in the tool parts of the injection moulding tool sections effects that exact positioning or fixing of the housing parts within the tool parts takes place so that tight tolerances can be met during welding. In particular, misalignment between the housing parts can be avoided. Furthermore, housing parts of the same batch and the same temperature are joined together during welding so that the danger of distortion due to thermal effects is reduced.

Particularly advantageous is a refinement in which the tool parts of the at least two injection moulding tool sections are displaceable between a closed injection position in which the housing parts are injection moulded, an open insertion position in which the at least one functional insert is inserted into the respective housing part, an open heating position in which the housing parts are heated in welding zones to be welded together, and a closed welding position in which the housing parts in the welding zones are welded together to form the housing. In the injection position within the respective injection moulding tool section, an outer tool part for forming an outer side or outer contour of the respective housing part interacts with an inner tool part for forming an inner side or inner contour of the respective housing part. In the injection position, the inner and outer tool parts form a cavity into which the plastic is injected so as to form the respective housing part. For setting the insertion position, the inner tool parts are removed so that the injection-moulded housing part remains in the respective outer tool part. To this extent, the injection-moulded tool parts are open on their inner side and therefore are accessible for inserting the respective functional insert. Inserting the respective functional insert can be carried out manually; however, it is preferably carried out by means of an insertion device, e.g., in the form of a robot. In the heating position, at least one heating element can be positioned by means of a heating device in such a manner that the heating zones can be heated up to a desired welding temperature. It is principally possible here that the insertion position and the heating position can be identical with regard to the relative position of the tool parts so that the tool parts do not have to be moved to get from the insertion position into the heating position. However, advantageously, heating the welding zones is carried out after the respective functional insert is inserted into the respective housing part. However, for certain applications it can be advantageous to already carry out the heating of the welding zones prior to inserting the functional insert, e.g., if a welded joint is also to be prepared between the functional insert and at least one of the housing parts. A two-stage heating process is also conceivable here. During a first heating phase, welding zones are heated on the respective tool part and/or on the respective functional insert, which welding zones are intended to produce a welded joint between the functional insert and the respective housing part when inserting the functional insert into the respective housing part. In a second heating phase, the welding zones of the housing parts to be welded together can then be heated up. Moreover, in particular during the second heating phase, welding zones can be heated on the functional insert and on a housing part, which welding zones are intended to produce a further welded joint between the functional insert and the housing part when joining together the housing. In the welding position, the housing is closed. In the course of this, the housing parts rest against each other in the region of their heated welding zones, wherein a defined pressure can be applied so as to improve the quality of the welded seams.

Particularly advantageous is an embodiment in which the injection position, the insertion position, the heating position and the welding position are implemented in the same injection moulding tool. Alternatively, it is principally possible to transfer the tool parts with the housing parts arranged therein, after injection moulding the housing parts and prior to welding the housing parts, from an injection moulding tool to a welding tool. The injection position is then implemented in the injection moulding tool. The heating position and the welding position are then implemented in the welding tool. The insertion position can then be implemented in both the injection moulding tool and the welding tool. Alternatively, inserting the functional insert can also be carried out during the transport from the injection moulding machine to the welding device. Expediently, the transfer is carried out in an automated manner, e.g. by means of a robot.

Expediently, the welding zones of the housing parts to be welded together are heated with at least one heating element so as to be able to subsequently weld the housing parts together for joining the housing. Thus, during heating, the heating zones are liquefied or softened to an extent that by contacting the welding zones when joining the housing, the desired welded joint or fusion connection can be implemented.

Advantageously, the welding process can be configured as hot gas welding. During hot gas welding, heating the welding zone is achieved by means of a hot gas which flows to the welding zones. In particular, it is therefore possible that hot gas flows out of the respective heating element and acts on the welding zones. However, alternatively, other welding methods are also conceivable. For example, the welding process can be configured as laser welding or ultrasonic welding or as NIR welding. NIR stands for "near infrared". During NIR welding, an infrared radiator is brought relatively close to the respective welding zone so as to achieve the desired heating by means of infrared radiation. In particular, the respective heating element thus can radiate infrared radiation and act therewith on the welding zones.

In another embodiment it is also possible that when welding the housing parts, at least one of the housing parts is additionally welded together with the at least one functional insert. Through this, e.g., fixing the functional insert on the respective housing part can be implemented.

It is particularly advantageous here if during welding, the housing parts enclose at least one component part of the functional insert, which component part is fed out of the housing, and are welded thereto so that the respective component part of the functional insert is fed out of the housing in a sealed manner.

For example, such a component part can be a connecting line for supplying or discharging fluids which is fully enclosed by housing part sections formed complementary thereto. By appropriately heating these contact areas, a sufficient welded joint can also be implemented there. However, heating can advantageously be combined or coordinated with the insertion in such a manner that the zones of the functional insert to be welded together with the housing parts are heated so as to facilitate the formation of the welded joints.

Expediently, the component is an intercooler or a fresh air distributor for an internal combustion engine. In this case, the functional insert is expediently a cooler block. The housing has a fresh air channel section into which the cooler block is inserted. In particular, the housing parts can be joined together in such a manner that a feed line and a return line of a coolant path are fed out of the housing. Furthermore, the housing can also be a channel section for the fresh air line of an internal combustion engine, in which channel section a functional component is inserted.

The component according to the invention, which preferably is an intercooler and/or fresh air distributor or an intake module, is characterized in that it is produced by the method illustrated above.

The tool according to the invention for carrying out the above-described method comprises at least one injection moulding device for injection moulding the housing parts, an insertion device for inserting the at least one functional insert into at least one of the housing parts, and a welding device for welding together the housing parts so as to form a housing while at least one functional insert is inserted therein.

According to an advantageous refinement of the invention, the housing has at least one rib which contacts the functional insert in a positive-locking manner and forms in this manner a labyrinth-like sealing between the housing and the functional insert. The positive-locking contact can be formed by a preformed recess on the functional insert. In other configurations, the rib is formed to be stiff in such a manner that when joining the housing parts and the functional insert, said rib generates a partial mechanical deformation of the functional insert. Here, the rib is configured in such a manner that it extends in the mounting direction of the housing parts toward the functional component. In particular, a fresh air distributor has such a rib, wherein the rib is pressed into fins of a cooler block. The rib pressed into the fins penetrates only into those regions in which it is still arranged after the final assembly. Deformation of partial regions in which the rib is no longer arranged after the final assembly does not take place so that reliable sealing is achieved.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination but also in other combinations or alone without departing from the context of the present invention.

Preferred exemplary embodiments of the invention are illustrated in the drawings and are explained in more detail in the following description, wherein identical reference numbers refer to identical, or similar, or functionally identical components.

BRIEF DESCRIPTION OF THE DRAWINGS

In the figures, schematically.

DETAILED DESCRIPTION

Figure 1:
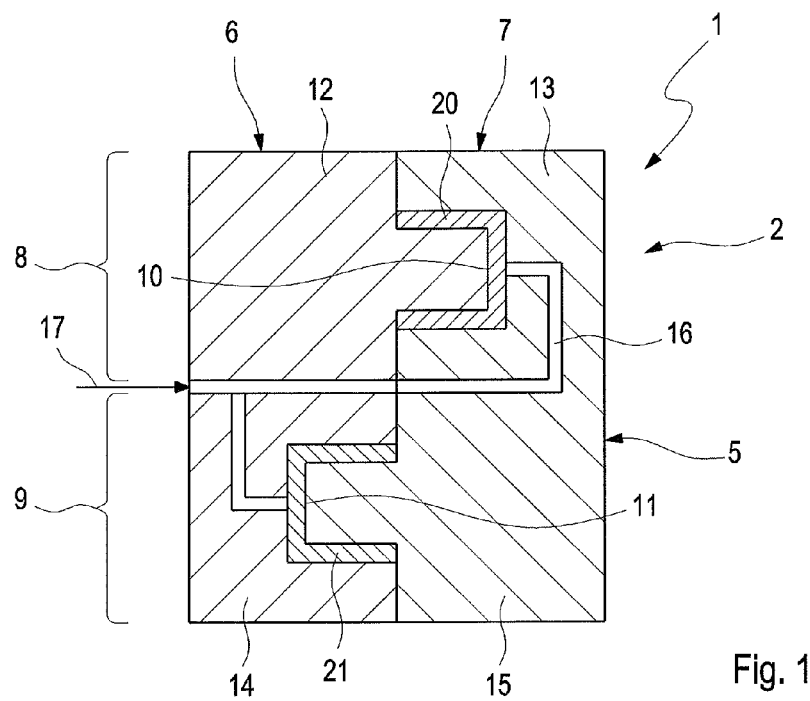
FIGS. 1 to 9 each show a greatly simplified schematic diagram of a tool in different stages of a method for producing a component.
Figure 2:
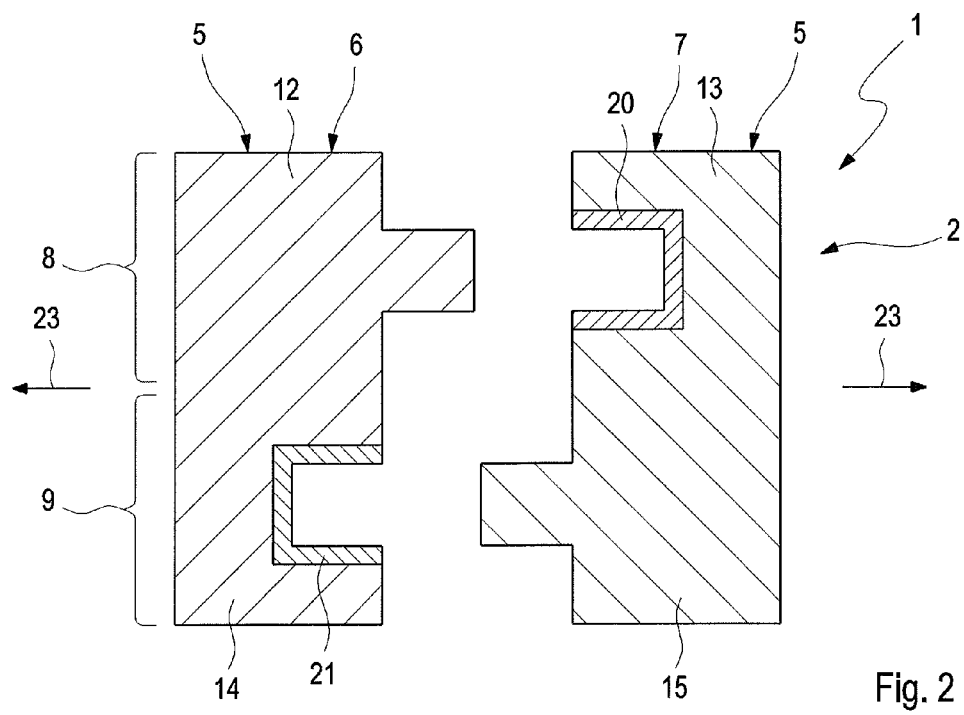
Figure 3:
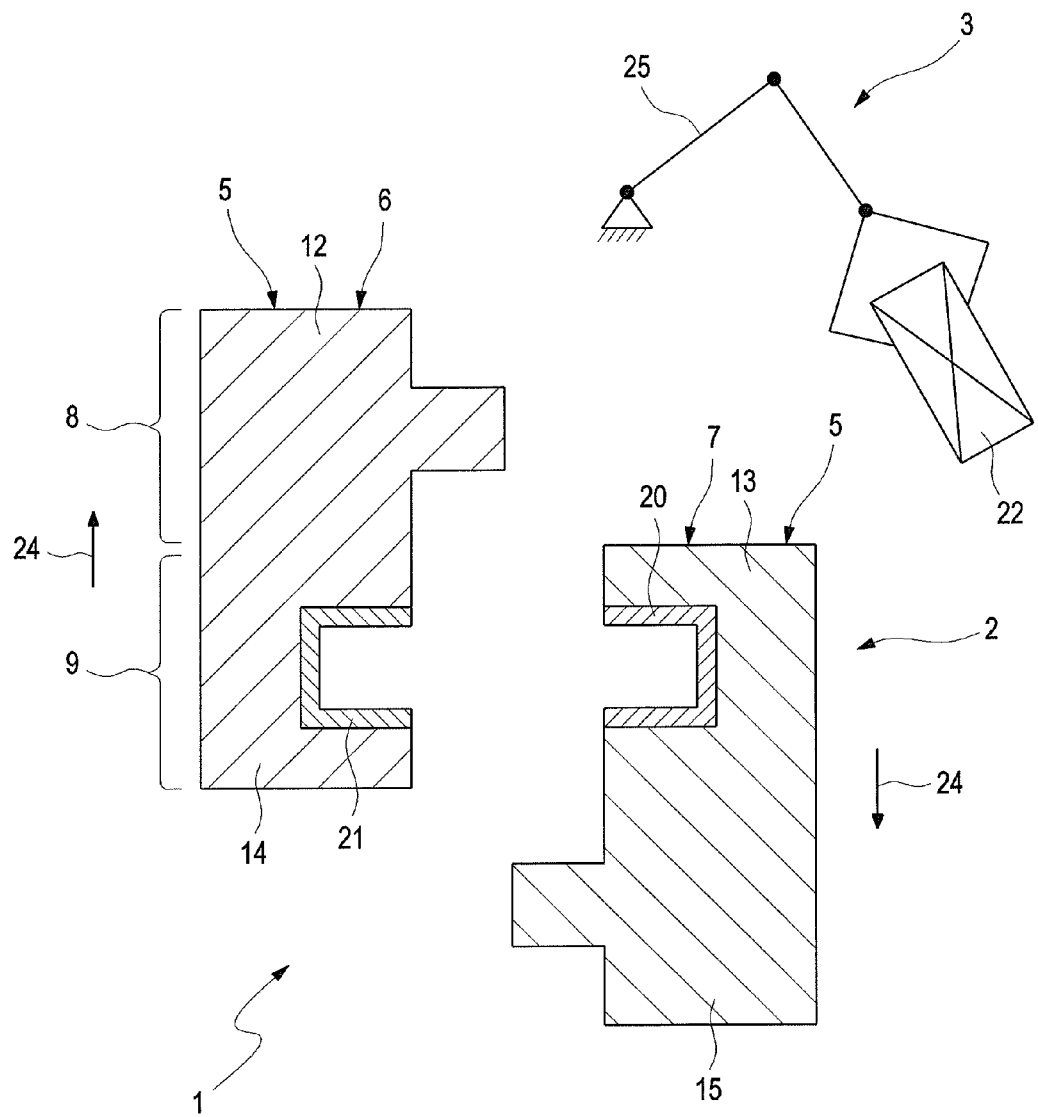
Figure 4:
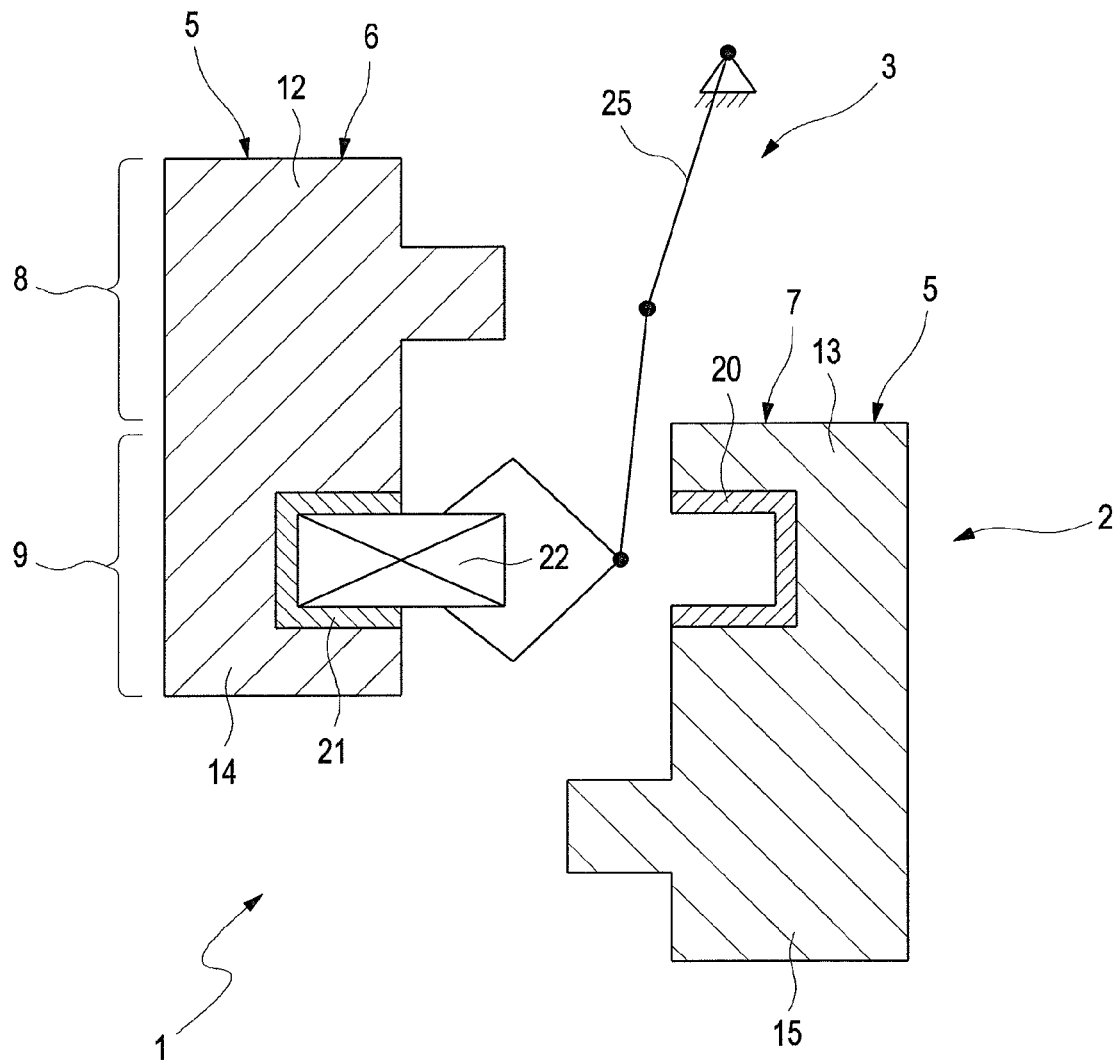
Figure 5:
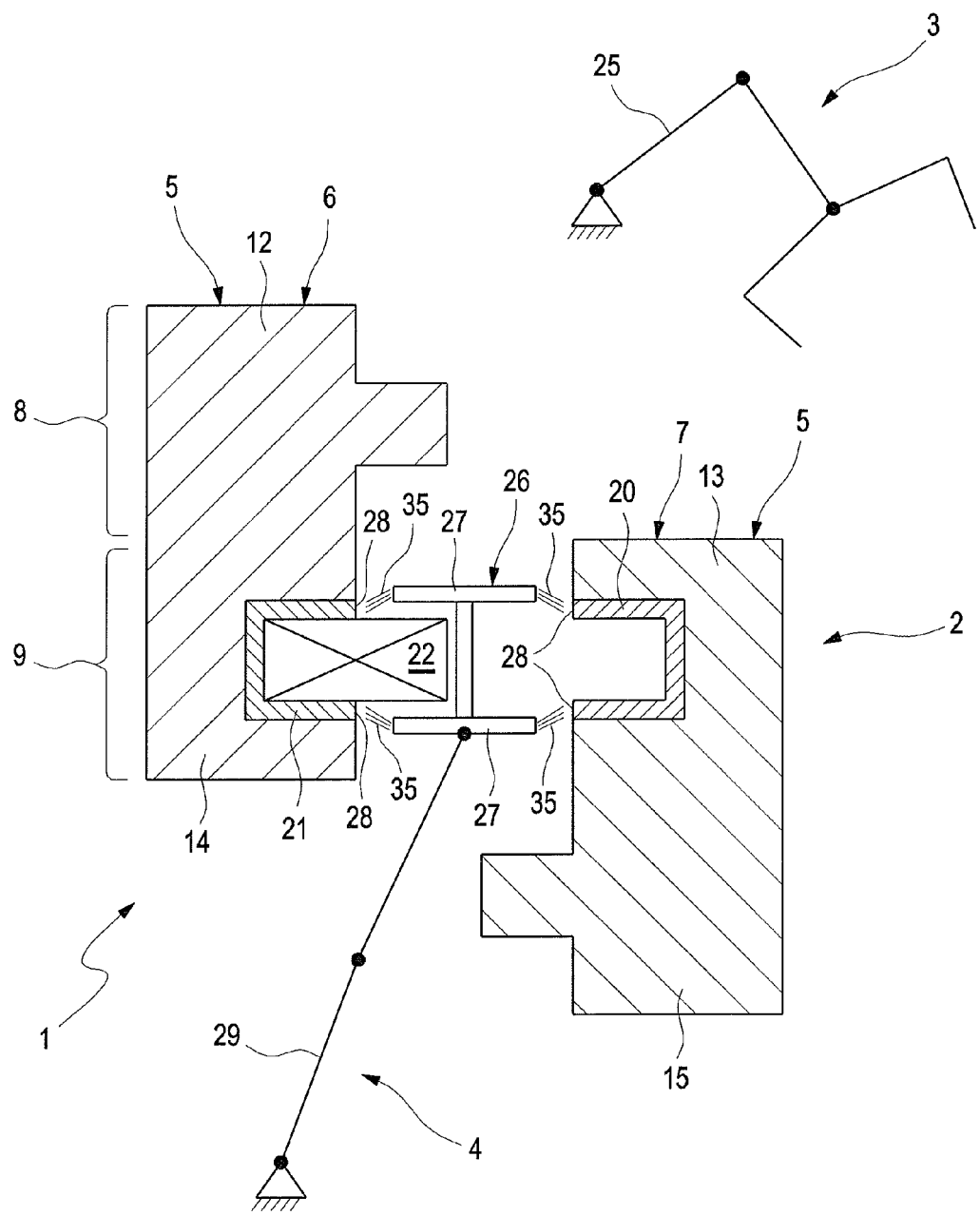

According to the FIGS. 1 to 9, a device 1 comprises an injection moulding device 2, an insertion device 3 shown in the FIGS. 3 to 5, and a welding device 4 shown in FIG. 5. The injection moulding device 2 comprises an injection moulding tool 5 that has two mould bodies 6, 7 that are movable relative to each other. In the preferred embodiment shown here, the injection moulding tool 5 and the mould bodies 6, 7 are divided into two injection moulding tool sections 8, 9 which are indicated by brackets in the FIGS. 1 to 9, at least for the first mould body 6 illustrated on the left in the FIGS. 1 to 9. Each injection moulding tool section 8, 9 is formed by two tool parts which engage with each other for forming cavities 10, 11 according to the FIGS. 1 and 9 so as to define an outer contour and an inner contour of the respective workpiece to be produced. Thus, in the upper or first injection moulding tool section 8 in the FIGS. 1 to 9, an inner tool part 12 and outer tool part 13 are provided. The inner tool part 12 is located in the first mould body 6 illustrated on the left, while the outer tool part 13 is formed in the second mould body 7 illustrated on the right. In the second injection moulding tool section 9 illustrated at the bottom in the FIGS. 1 to 9, an outer tool part 14 is located in the first mould body 6, while an inner tool part 15 is formed on the second mould body 7.

Figure 9:
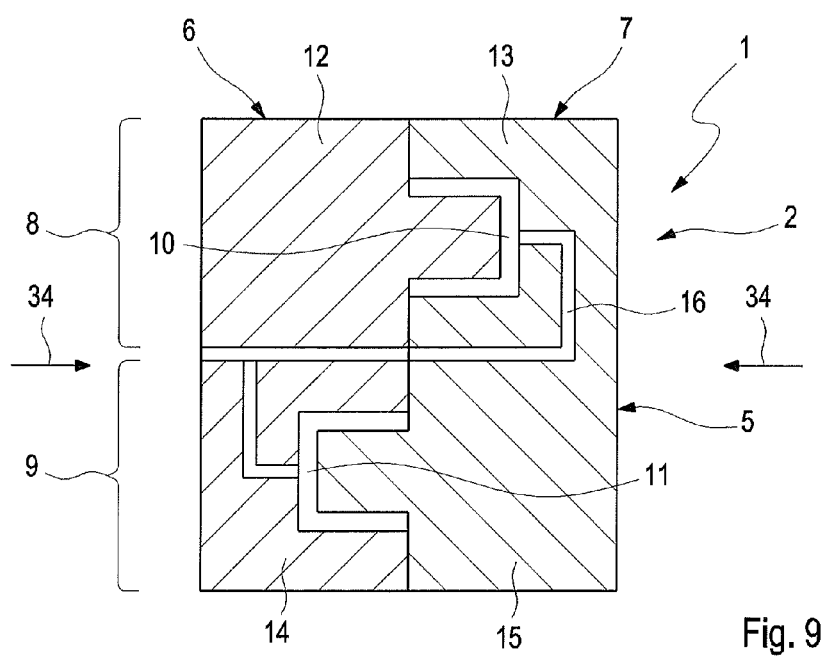

In the two mould bodies 6, 7, injection channels 16 are integrated according to the FIGS. 1 and 9, which lead to the cavities 10, 11 and to which plastic for injection moulding the workpieces can be fed according to an arrow 17 indicated in FIG. 1.

The device 1 serves for producing a component 18 shown in the FIGS. 6 to 8 and 10. The component 18 has a housing 19 that is assembled from at least two housing parts 20, 21. Furthermore, the component 18 comprises at least one functional insert 22 that is arranged inside the housing 19. The operating mode of the device 1 and the production method that can be carried out by means of the device 1 are explained in more detail below.

In FIG. 1, the tool parts 12, 13, 14, 15 are in an injection position in which the inner tool parts 12, 15 engage in the associated outer tool parts 13, 14 so as to form the cavities 10, 11 for producing the housing parts 20, 21. According to FIG. 1, the plastic can be injected in this injection position according to the arrow 17 so as to injection mould the two housing parts 20, 21.

According to FIG. 2, the mould bodies 6, 7 and therefore the tool parts 12, 13, 14, 15 can be moved apart from each other according to the arrows 23 so as to open the injection moulding tool 5. The injection moulded housing parts 20, 21 remain in the respective outer tool part 13 and 14, respectively.

According to FIG. 3, the mould bodies 6, 7 and therefore also the tool parts 12, 13, 14, 15 can be displaced relative to each other according to the arrows 24 in such a manner that now the outer tool parts 13, 14 and therefore the housing parts 20, 21 arranged therein are oriented in alignment with each other. The open injection moulding tool 5 is now in an insertion position. With the aid of the insertion device 3, which, e.g., comprises a robot arm 25, the functional insert 22 can now be placed or inserted according to FIG. 4 into one of the housing parts 20, 21. In the example, the first housing part 20 illustrated on the right remains empty while the functional insert 22 is inserted into the second housing part 21 illustrated on the left.

After inserting the functional insert 22 or simultaneously with inserting the functional insert 22, the welding device 4 is activated. According to FIG. 5, the welding device 4 comprises a heating device 26 that has at least one heating element 27 by means of which welding zones 28 of the housing parts 20, 21 can be heated. In the region of these welding zones 28, the housing parts 20, 21 are to be welded together. In the example, the heating position of the injection moulding tool 5 shown in FIG. 5 coincides with the insertion position according to FIG. 3. For positioning the respective heating element 27, the heating device 26 or the welding device 4 can have a further robot arm 29, for example.

The welding device 4 or the heating device 26 thereof can be designed, e.g., in such a manner that the welding process is configured as hot gas welding. In this case, the respective heating element 27 can be designed such that a hot gas 35 flows out of said heating element and acts on the welding zones 28.

Figure 6:
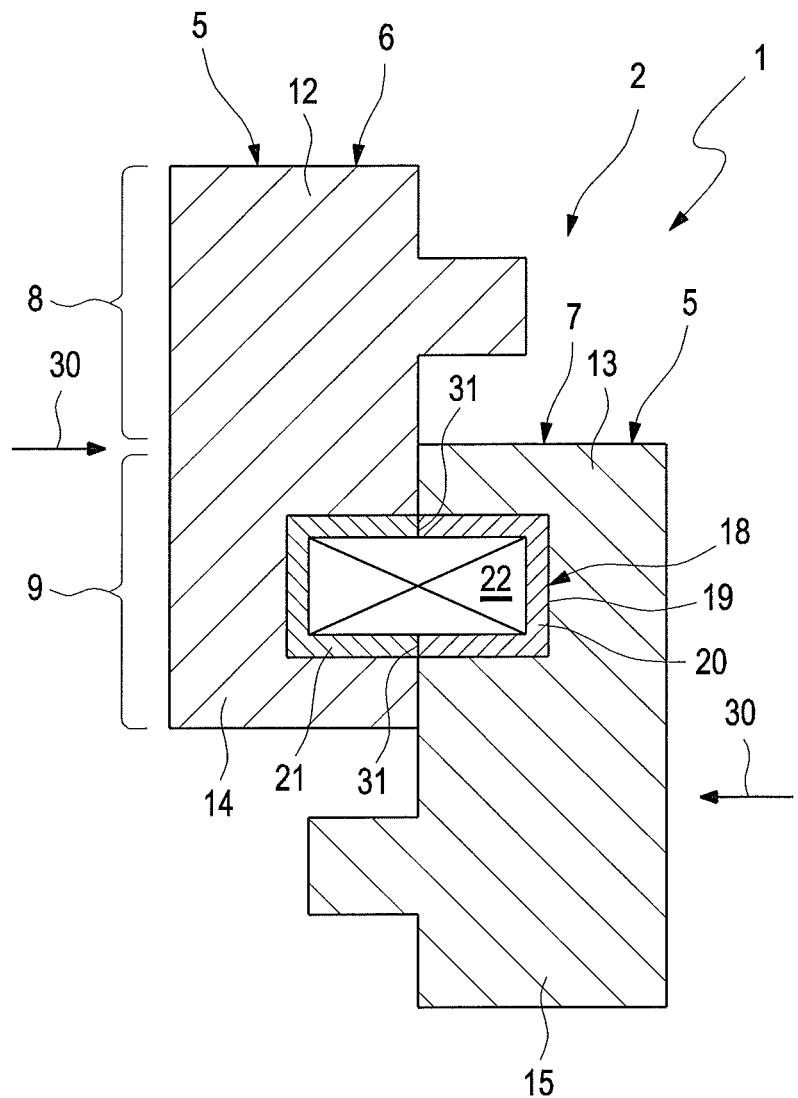

After heating the welding zones 28, the mould bodies 6, 7 can be moved toward each other according to FIG. 6 corresponding to the arrows 30 until the welding zones 28 rest against each other and are in particular pressed against each other. The injection moulding tool 5 is now in the welding position. The welding zones 28 of the two housing parts 20, 21 are thereby combined into weld seams 31. Through this, the housing 19 is joined together while the functional insert 22 is already arranged inside the housing 19.

Figure 7:
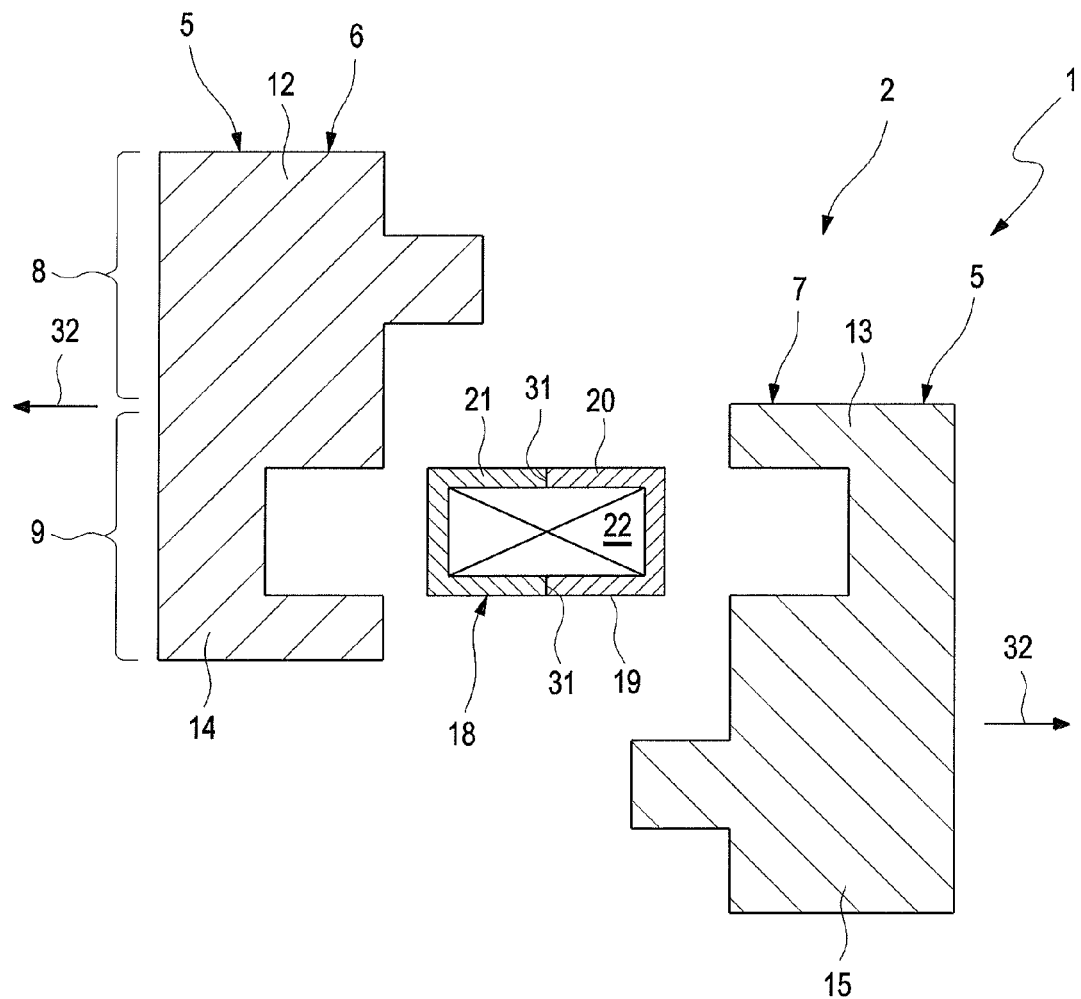

Subsequently, demoulding of the housing 19 or of the component 18 with the housing 19 and the functional insert 22 enclosed therein takes place according to FIG. 7. For this, the two mould bodies 6, 7 and therefore the tool parts 12, 13, 14, 15 are moved apart from each other according to the arrows 32 so that the injection moulding tool 5 is open again and the component 18 can be demoulded or removed from the outer tool parts 13, 14.

Figure 8:
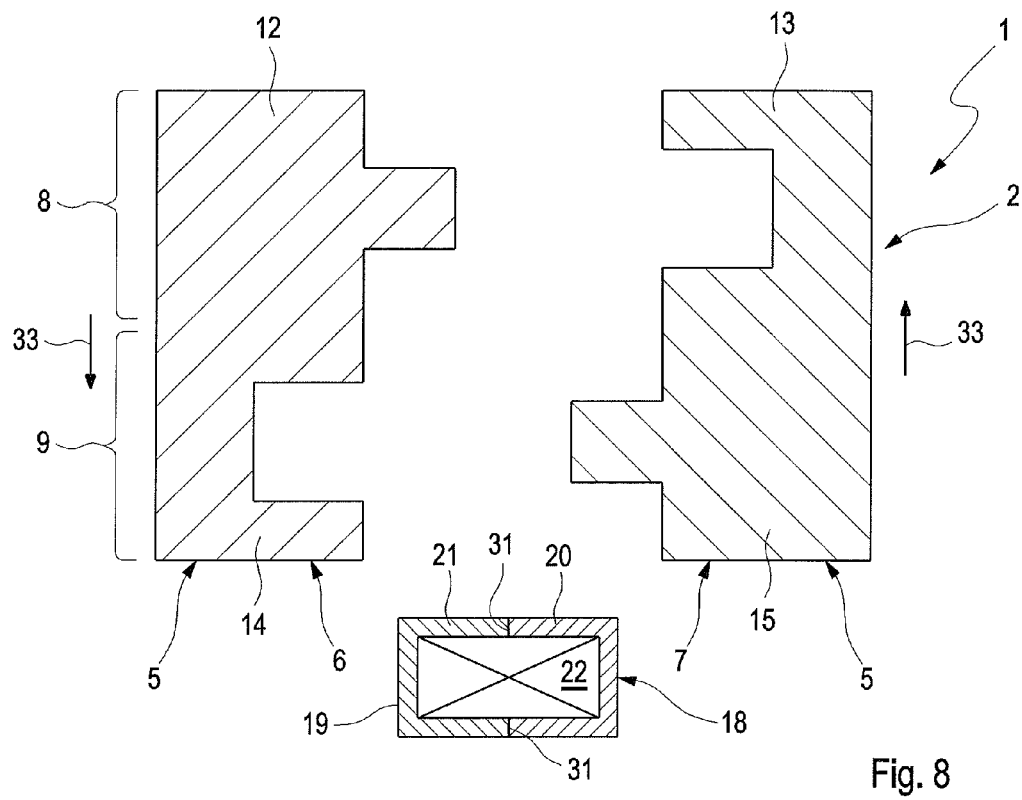

Subsequently, according to FIG. 8, the mould bodies 6, 7 and therefore the tool parts 12, 13, 14, 15 are moved toward each other according to the arrows 33 until, within the tool sections 8, 9, the respective inner tool parts 12 and 15, respectively, are oriented again in alignment with the associated outer housing parts 13 and 14, respectively. Subsequently, the mould bodies 6, 7 and therefore the tool parts 12, 13, 14, 15 according to FIG. 9 aligned in this manner can be moved toward each other again according to the arrows 34 so as to close the injection moulding tool 5, thus to take the injection position, and to form the cavities 10 and 11 for injection moulding new housing parts 20, 21.

In the FIGS. 3 and 4, the mould bodies 6, 7 and therefore the tool parts 12, 13, 14, 15 are in an insertion position. FIG. 5 shows a heating position which, in the embodiment shown here, does not differ from the insertion position. In FIG. 6, a welding position is shown in which joining the housing 19 takes place. It is shown that the different positions, thus the injection position, the insertion position or the heating position and the welding position are implemented in the same injection moulding tool 5.

Figure 10:
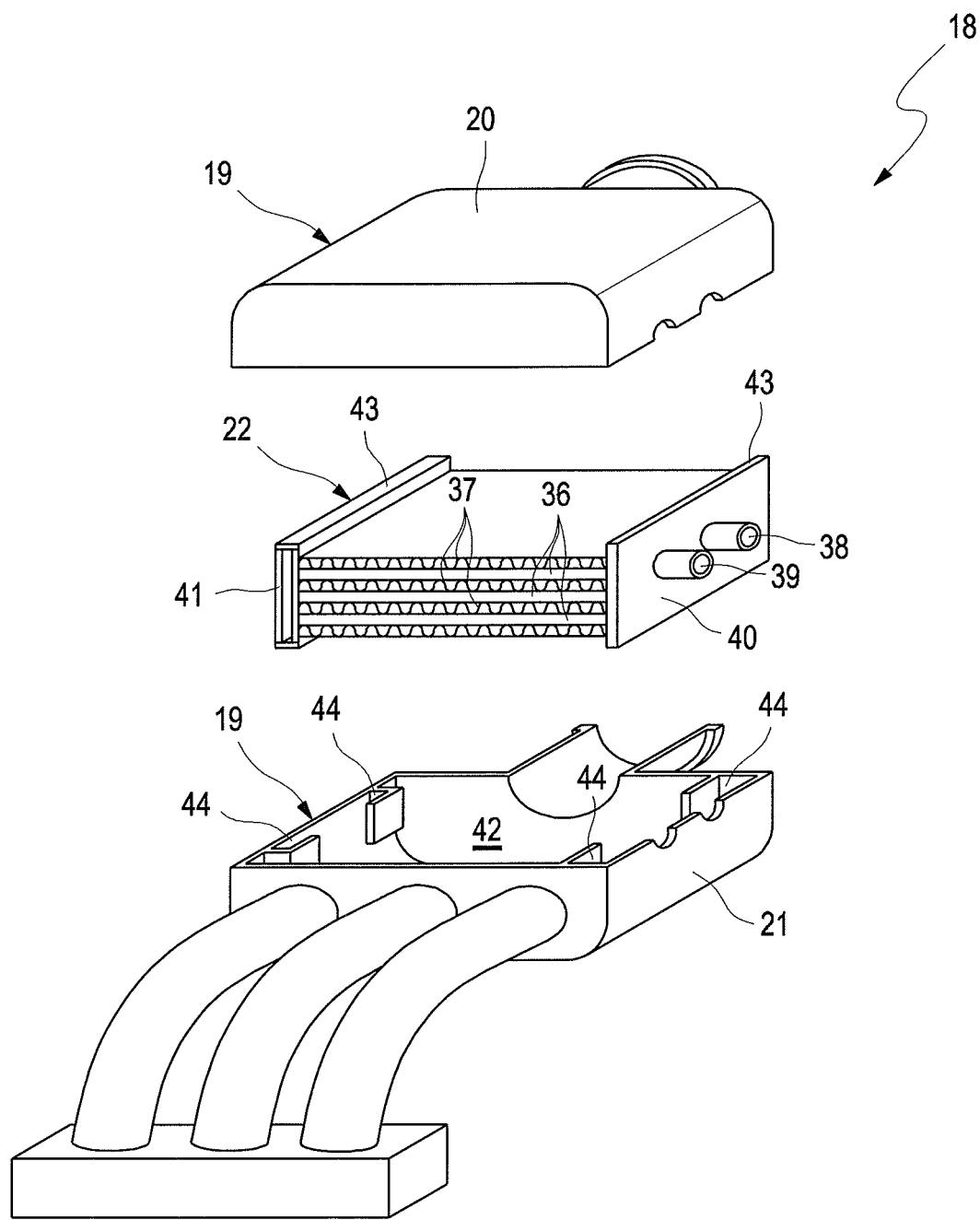
FIG. 10 shows an exploded illustration of a special embodiment of the component producible by means of the production method.

According to FIG. 10 the component 18 is preferably an intake module with an intercooler. The functional insert 22 is an intercooler with cooling channels 36 in which a coolant can circulate, and with fins 37 through which charge air can flow and which are arranged between the cooling channels 26. An inlet connection 38 and a return connection 39 are fed out of a distributor plate 40. Moreover, the cooling channels 36 opposite the distributor plate 40 are fluidically connected to each other via a deflection plate 41.

In its interior, the housing 19 has a fresh air channel section 42 into which the cooler block, thus the functional insert 22, is inserted. The housing parts 20, 21 form an upper part and a lower part of the housing 19.

Thus, in this embodiment, at least two component parts of the functional insert 22 of the finished housing 19, namely the inlet connection 38 and the return connection 39, are fed out of the housing 19. According to an advantageous embodiment, the housing parts 20, 21 can now enclose during welding these component parts (connections 38, 39) that extend out of the housing 19 and can be welded thereto. In this manner it can be ensured that said component parts, thus, in the present case, the connections 38, 39 are fed out of the housing 19 in a sealed manner.

Through suitable geometries, in particular ribs or webs, in the housing 19, or through additional elastic inserts, in particular seals, sealing between the housing 19 and the functional insert 22 can be improved. For this, e.g., seals can be inserted as inserts into one or both housing parts 20, 21.

Alternatively, the functional component can also be provided with a suitable geometry or surrounded with a seal and can be inserted together with this seal into the housing 19 or one of the housing parts 20, 21. In further configurations, a further component, which fulfils other functions such as, e.g., acoustic and/or thermal decoupling between the functional component and the housing 19, can also be provided in addition to or as an alternative to a seal. Such additional components can be, e.g., mats or foils made from materials with the desired properties.

Figure 11:
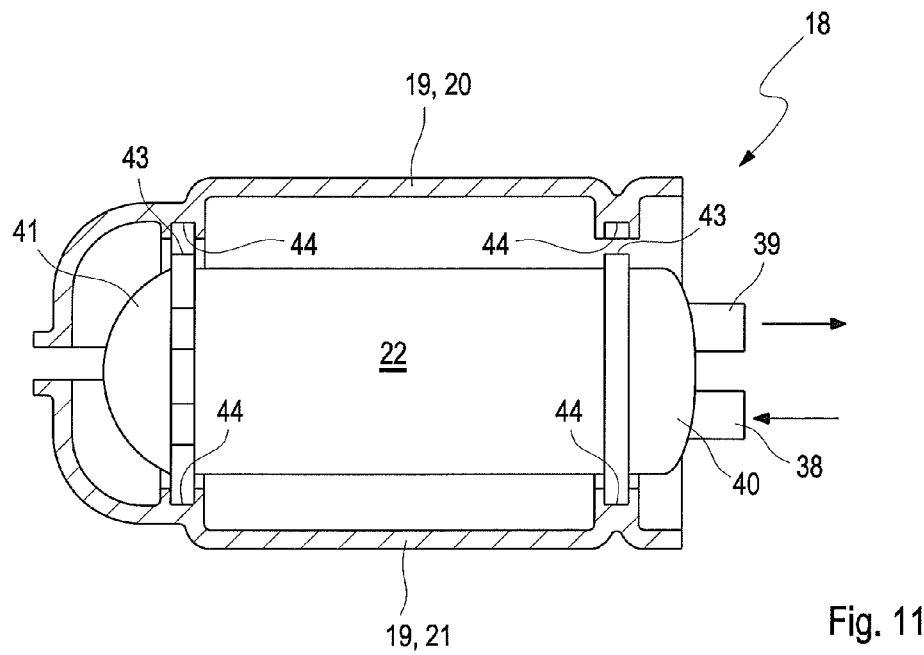
FIG. 11 shows a fresh air distributor with an intercooler in a partially assembled state.

In FIG. 11, a fresh air distributor with an intercooler is illustrated in a partially assembled state in a sectional view. Parts corresponding to FIG. 10 are designated by the same reference numbers. The functional insert 22 has contact points 43 which correspond with receptacles 44 on the housing parts 20, 21. The contact points 43 are formed on the left as segmented, circumferentially arranged projections. On the right side, the contact points 43 are formed as a circumferential rim. On the left side, the receptacle 44 is formed as circumferential groove. On the right side, the receptacle 44 is formed as a segmented recess arranged distributed on the circumference. Of course, the contact points 43 and/or the receptacles 44 can be configured identically on both sides, or can have the respective other embodiment of the one that is illustrated. In other configurations it is also possible that only a single contact point 43 is provided which corresponds with the at least two housing parts 20, 21. This single contact point 43 can be arranged in the middle of the functional insert 22 or near the front side. By joining the housing parts 20, 21, the contact point 43 is fixed in the receptacle 44. Thus, axial displacement of the functional insert 22 in the assembled state is prevented. Furthermore, the contact point 43 together with the receptacle 44 form a bearing of the functional insert 22 within the housing 19. In configurations with a circumferentially formed contact point 43 and a circumferentially formed receptacle 44, sealing can be provided in this region.

Figure 12:
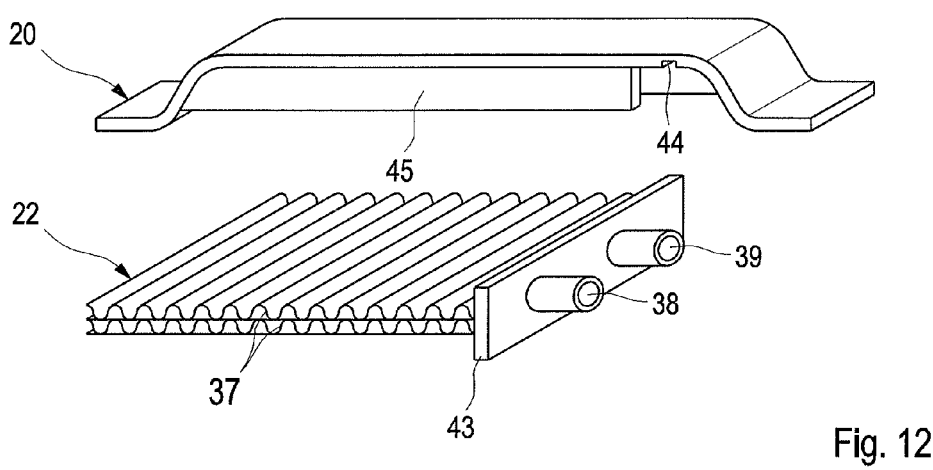
FIG. 12 shows a segment of a fresh air distributor with an intercooler prior to assembly.

In FIG. 12, a segment of a fresh air distributor with an intercooler prior to assembly is illustrated. The corresponding second housing part 21 is not illustrated. In this configuration, the first housing part 20 has a rib 45 which protrudes in the direction of the functional insert 22. When mounting the functional insert 22 in the housing part 20, the rib 45 is pressed into partial regions of the functional insert 22. The contact point 43 engages in the receptacle 44 thereby fixing the axial position of the functional insert 22 within the housing 19. Due to the fact that the rib 45 extends in the mounting direction of the housing parts 20, 21, the rib 45 can engage in the functional insert 22 in such a manner that only those regions are deformed that are contacted during pressing. Thus, this provides sealing between the rib 45 and the functional insert 22 that prevents an excessive leakage flow, and the charge air is forced to flow through the intercooler 22.

Figure 13:
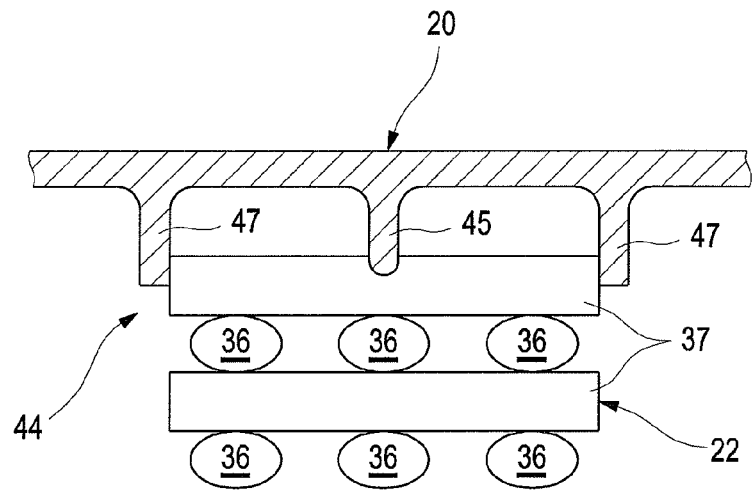
FIG. 13 shows a side view after assembly according to FIG. 12 in a sectional view.

In FIG. 13, a side view of the fresh air distributor after assembly is illustrated, wherein the sectional view shows a view that is shifted by 90° with regard to FIG. 12. Components which correspond to the ones already described are designated by the same reference numbers. In this illustration it is shown that the rib 45 engages in the fins 37, thereby forming a labyrinth seal. Furthermore, a receptacle 44 is illustrated which is formed from webs 47 that are spaced apart from each other. The functional insert 22 is inserted and fixed in this receptacle 44. The receptacle 44 is shown exemplary only and, of course, can also exhibit other configurations, in particular according to FIG. 11.

Figure 14:
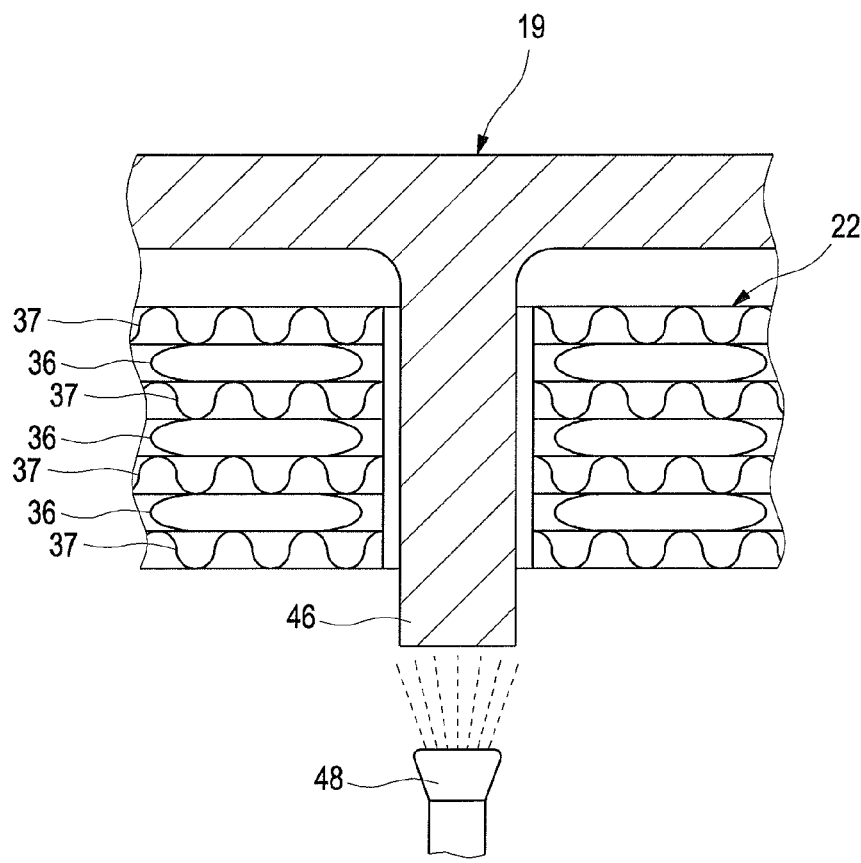
FIG. 14 shows an alternative configuration of FIG. 13.

FIG. 14 illustrates an alternative configuration of FIG. 13. In this configuration, the housing 19 has a tie rod 46 which protrudes through the functional component 22. Prior to joining the housing parts 20, 21 together, the tie rod 46 is heated via a heat source 48 in such a manner that when joining the housing parts 20, 21 together, the lower region of the tie rod 46 firmly bonds with the opposite housing part 20, 21. This is a simple and cost-effective type of connection, in particular for housing parts 20, 21 made of plastic. A suitable heat source 48 is, e.g., hot air, laser or infrared radiation. Using a firm bond between the tie rod 46 and the opposing housing part 20, 21 is suitable in particular for avoiding relative movements, such as, e.g., swelling of the housing, between opposite surfaces.

The features explained exemplary based on the fresh air distributor and the intercooler can also be applied to other housing and functional components, of course.

The invention claimed is:

1. A method for producing an intake module, comprising:
   providing a housing and at least one intercooler arranged therein;
   forming at least two housing parts via injection moulding from plastic;
   inserting at least one intercooler into at least one of the housing parts; and
   welding together the housing parts, with at least one intercooler inserted therein, to form the housing;
   wherein the intercooler has contact points to at least two of the housing parts; and
   wherein the housing parts have at least one receptacle holding the intercooler in a positive-locking manner at least in certain sections.

2. The method according to claim 1, wherein the housing parts hold the intercooler under pretension.

3. The method according to claim 1, wherein inserting the intercooler into the respective housing part and welding the housing parts to form the housing is carried out with freshly injection moulded housing parts facilitating the housing parts to shrink onto the intercooler during cooling.

4. The method according to claim 1, wherein the at least two housing parts are injection moulded in a respective injection moulding tool section, and the respective injection moulding tool sections are formed in the same injection moulding tool.

5. The method according to claim 4, wherein for the welding process, the at least two housing parts remain in a respective tool part of the injection moulding tool sections.

6. The method according to claim 5, wherein the tool parts of the at least two injection moulding tool sections are displaceable between an injection position in which the housing parts are injection moulded, an insertion position in which the at least one intercooler is inserted into the respective housing part, a heating position in which the housing parts are heated in welding zones to be welded together, and a welding position in which the housing parts are welded in the welding zones to form the housing.

7. The method according to claim 6, wherein the closed position, the insertion position, the heating position and the welding position are implemented in the same injection moulding tool.

8. The method according to claim 6, wherein welding zones of the housing parts to be welded together are heated with at least one heating element.

9. The method according to claim 8, wherein one of:
   the welding process is configured as hot gas welding, wherein a hot gas flows out of the respective heating element and acts on the welding zones; and
   the welding process is configured as NIR welding, wherein infrared radiation is emitted out of the respective heating element and acts on the welding zones.

10. The method according to claim 9, wherein when welding the housing parts, at least one of the housing parts is welded together with the at least one intercooler.

11. The method according to claim 5, wherein the tool parts of the at least two moulding sections are displaceable between at least one:
   injection position in which the housing parts are injection moulded;
   insertion position in which the at least one intercooler is inserted into the respective housing part;
   heating position in which the housing parts are heated in welding zones to be welded together; and
   welding position in which the housing parts are welded in the welding zones to form the housing.

12. The method according to claim 1, wherein when welding the housing parts, at least one of the housing parts welds together with the at least one intercooler.

13. The method according to claim 12, wherein during welding, the housing parts enclose at least one component part of the intercooler, wherein the component part is fed out of the housing and welded thereto so that the respective component part is fed out of the housing in a sealed manner.

14. The method according to claim 13, wherein the housing includes a fresh air channel section into which the intercooler is inserted.

15. The method according to claim 1, wherein one of:
   the housing parts are injection moulded in respective injection moulding tool sections, and
   the at least two injection moulding tool sections are formed in the same injection moulding tool.

16. The method according to claim 1, wherein welding the housing parts enclose at least one component part of the intercooler, wherein the at least one component part extends out of the housing and are welded thereto such that the at least one component part extends out of the housing in a sealed manner.

17. The method according to claim 1, wherein the housing includes the fresh air channel section into which the intercooler is inserted.

18. An intake module production device, comprising:
   an injection moulding device for injection moulding at least two housing parts of an intake module from plastic;

an insertion device for inserting at least one intercooler into at least one of the housing parts; and a welding device for welding together the housing parts, with at least one intercooler inserted therein, so as to form the intake module;

wherein at least one of the insertion device and the welding device includes a robot arm, and the welding device includes at least one heating element configured to heat respective welding zones of the housing parts, hot gas flowing out of the at least one heating element to act on the respective welding zones.

19. A method, comprising:

forming at least two housing parts by injection moulding from plastic in a respective moulding tool section;

inserting, by an insertion device, at least one intercooler into at least one of the housing parts;

heating, by at least one heating element of a welding device, the housing parts at respective welding zones;

welding, by the welding device, the housing parts together at welding zones to form a housing with the at least one intercooler inserted therein; and wherein the intercooler has contact points to at least two of the housing parts, and wherein the housing parts have at least one receptacle holding the at least one intercooler in a positive-locking manner at least in certain sections.

* * * * *